UNITED STATES PATENT OFFICE.

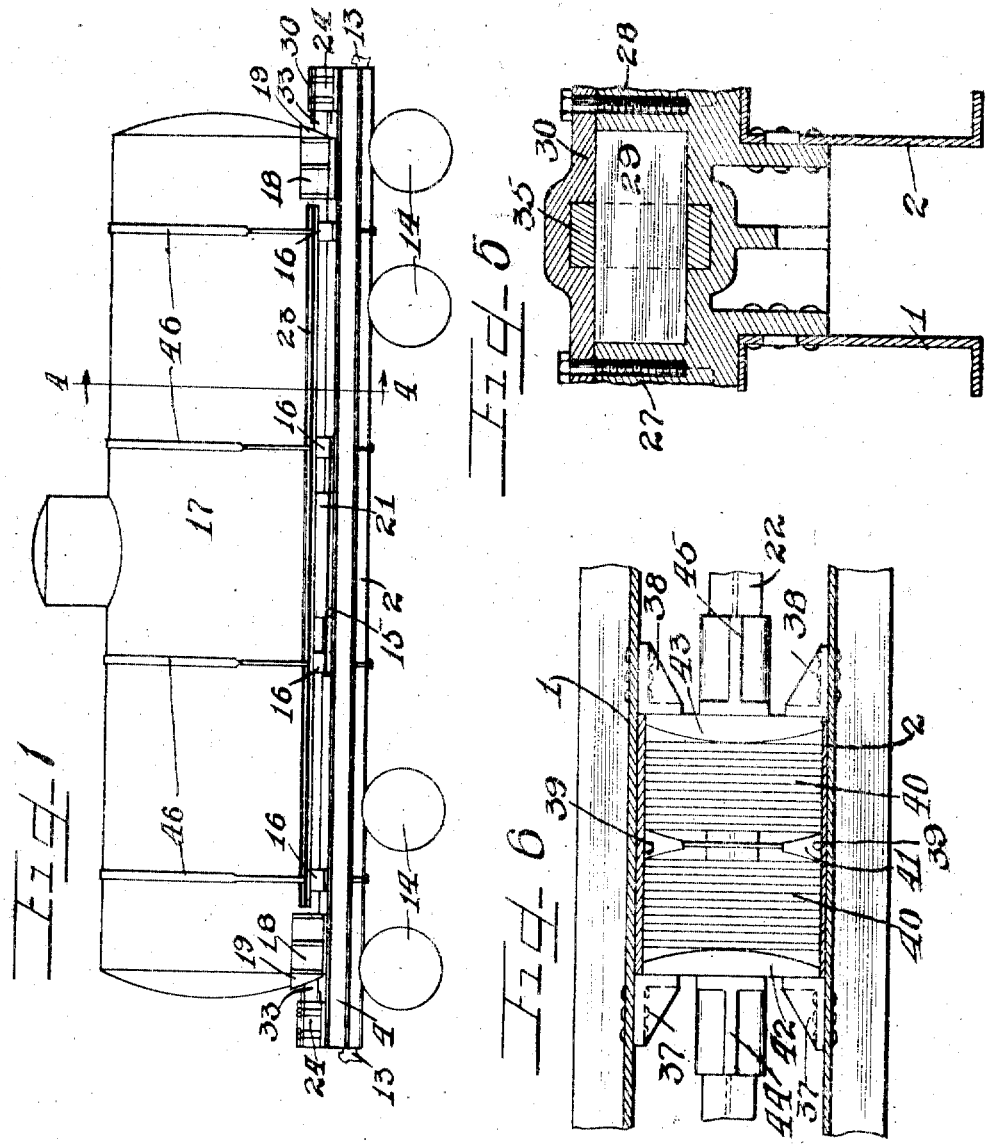

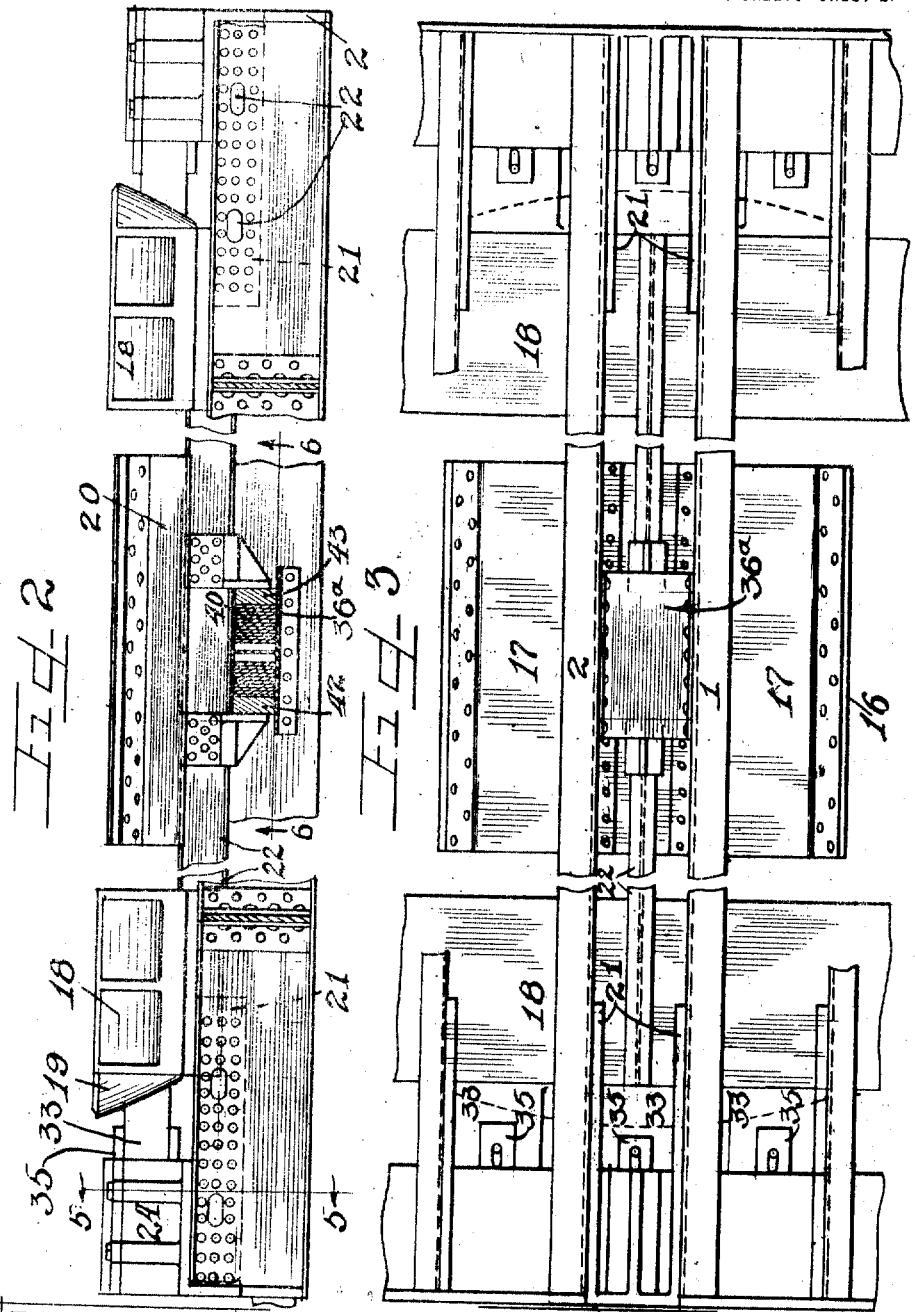

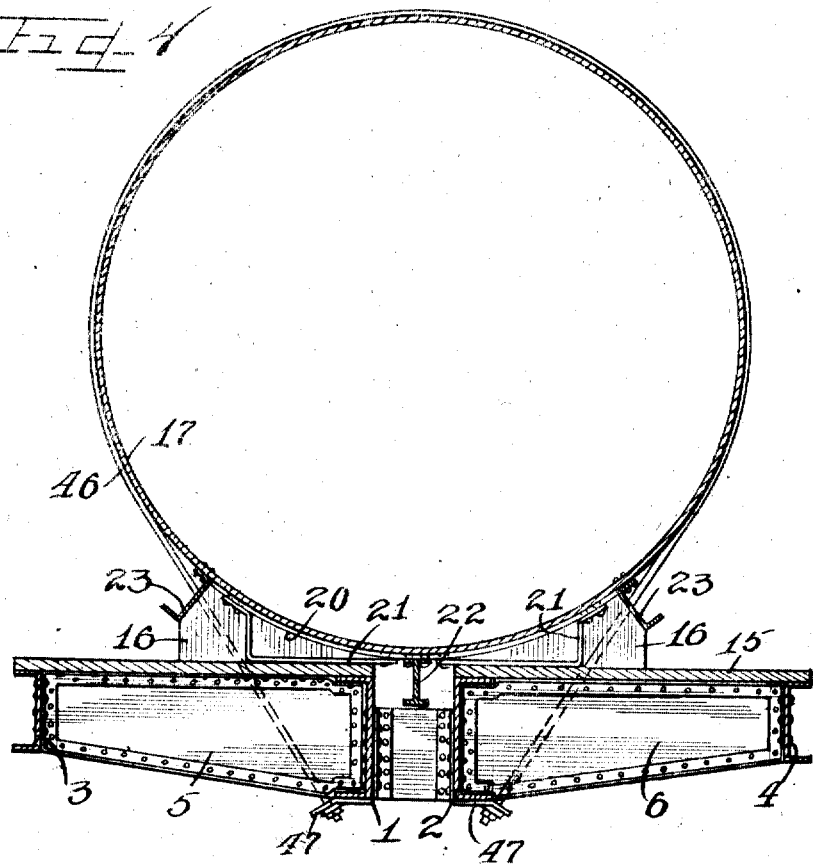
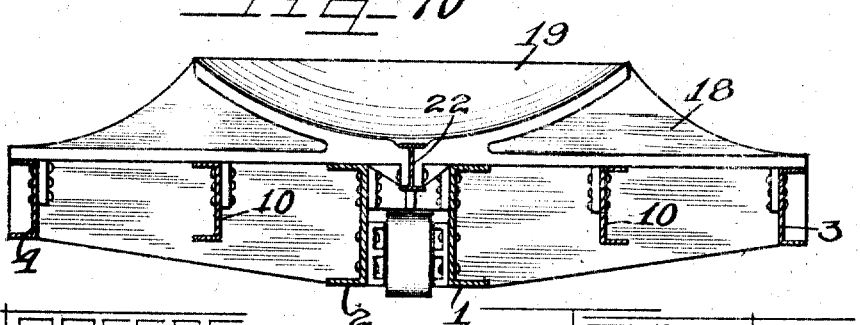

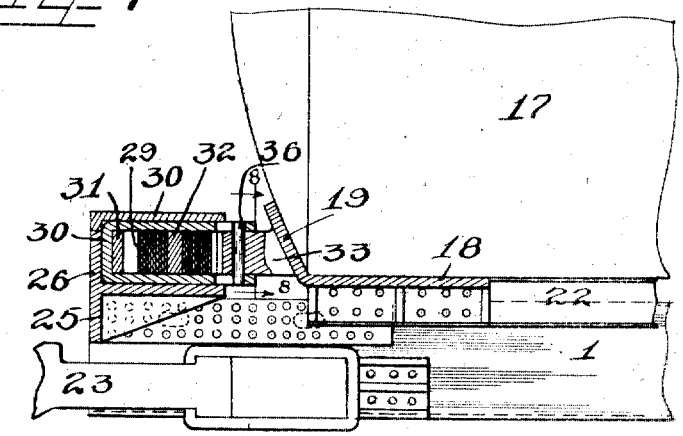
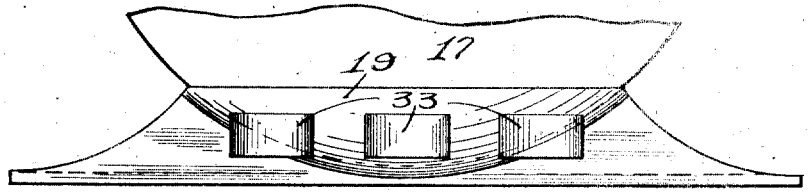
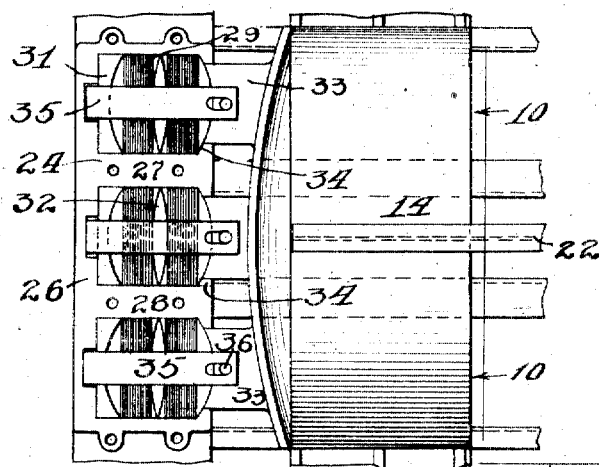

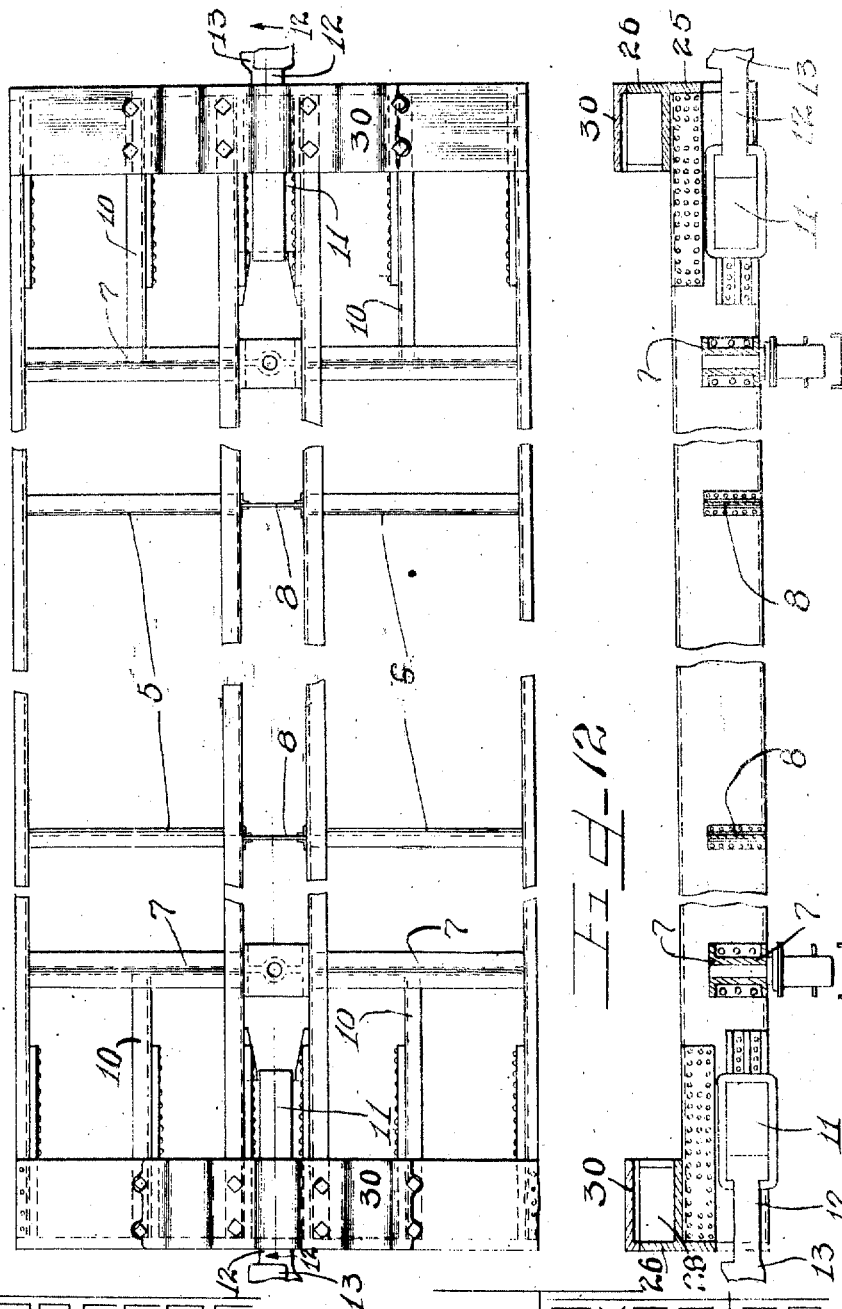

JAMES MILTON WAUGH, OF CHICAGO, ILLINOIS.

SHOCK-ABSORPTION GEAR FOR TANK AND OTHER CARS.

1,245,841.  Specification of Letters Patent.  Patented Nov. 6, 1917.

Application filed August 14, 1914. Serial No. 856,745.

*To all whom it may concern:*

Be it known that I, JAMES MILTON WAUGH, a citizen of the United States, and a resident of the city of Chicago, in the county of Cook and State of Illinois, have invented certain new and useful Improvements in Shock-Absorption Gear for Tank and other Cars; and I do hereby declare that the following is a full, clear, and exact description of the same, reference being had to the accompanying drawings, and to the numerals of reference marked thereon, which form a part of this specification.

The constant buffing and impact stresses to which a car is subjected in switching and in transfer from place to place, and even in sudden changes of speed thereof, often proves disastrous in cases where the contents of the car have an appreciable mass. This is particularly true in the case of tank cars, the fluid contents of which is generally of great weight, and the inertia effect of the practically incompressible fluid acts to cause a heavy impact load or hammer blow upon the ends of the tank. The enormous stresses thus imposed often cause failure of the tank itself or destruction of the connections between the tank and the underframe, and in any event occasions a serious strain upon the structure. I overcome the damaging effects due to such causes by mounting the tank movably upon the car underframe, and providing a number of shock absorption gears disposed at different points, and on and between which the tank is carried and is floatingly suspended on the underframe so as to absorb the shocks which otherwise would be imparted injuriously thereto through the underframe. In other words, in addition to the usual draft and buffing gears with which the car underframe is equipped, I absorb shock by permitting a yielding resisted movement of the tank relative the underframe, the shock absorbing means acting to gently return the parts to normal after each shock absorption. The particular type of absorption gear illustrated in the drawings (as a preferred form only) for the purposes of taking up the stress which would otherwise be transmitted between the tank and the car frame, is of a construction peculiarly well adapted for the purpose, inasmuch as the recoil effects present in most resilient gears is obviated. This is due to the fact that the energy of the shock, although absorbed by the gear, is not stored up, but is dissipated, due to friction between the parts, and passes off in the form of heat, enough resiliency, however, being present in the members of the gear to gradually return the parts to normal.

In this invention the tank is supported or cradled upon a rigid sub-frame, which is movably mounted upon the car underframe, and the absorption devices are connected between the sub-frame and underframe, so that movement of the tank in its supporting means is thus yieldably resisted by all the absorption gears simultaneously.

It is an object, therefore, of this invention to construct a tank car in which the tank is movably mounted upon the car underframe, and with yieldable connections therebetween to absorb shocks transmitted through the car frame.

It is also an object of this invention to construct a tank car wherein means are provided for absorbing the stress transmitted between the car underframe and the tank, said means permitting a slight relative movement between the tank and the car frame, and with mechanisms connected upon said car frame to positively support and retain the tank thereon, particularly at such times as when the stress is applied other than longitudinally of the tank and frame, for instance, when the car is upon a curved track.

It is also an object of this invention to construct a tank car in which the tank is securely supported and cradled upon a sub-frame, which is movable upon the underframe of the car, and with absorption gears connected between said sub-frame and underframe to yieldably resist such relative movement, the construction and disposition of the sub-frame being such as to prevent the application of practically all local stresses to the tank.

It is furthermore an important object of this invention to provide a car construction wherein a sub-frame for the car body is movably mounted upon the car underframe, and with shock absorption gears connected in a manner to greatly reinforce and strengthen the car underframe and co-acting with means on the sub-frame to yieldably resist movement thereof relative the underframe.

It is finally an object of this invention to construct an improved form of tank car in which the defects of former constructions which have generally resulted disastrously to the car under abnormal buffing conditions, are entirely obviated, and yet without complications of parts or intricate mechanisms liable to become damaged or deranged.

The invention (in a preferred form) is illustrated in the drawings and hereinafter more fully described.

In the drawings:

Figure 1 is a side elevation of a tank car embodying the principles of my invention.

Fig. 2 is an enlarged view broken away, illustrating in side elevation, with parts in section, the sub-frame mounted upon the car underframe.

Fig. 3 is a bottom plan view partly broken away of the mechanisms shown in Fig. 2.

Fig. 4 is an enlarged vertical section taken on line 4—4 of Fig. 1.

Fig. 5 is a detail section taken on line 5—5 of Fig. 2, with the usual draft and buffing gears omitted.

Fig. 6 is an enlarged section taken on line 6—6 of Fig. 2.

Fig. 7 is an enlarged fragmentary side view partly in section of the front end of the car frame and tank thereon, with the draft rigging omitted.

Fig. 8 is a detail section taken on line 8—8 of Fig. 7, with parts omitted.

Fig. 9 is a top plan view of the mechanisms illustrated in Fig. 7, with the tank and cover plate of the absorption gear omitted.

Fig. 10 is a fragmentary detail section taken on line 10—10 of Fig. 9.

Fig. 11 is a fragmentary top plan view of the underframe.

Fig. 12 is a longitudinal section thereof.

As shown in the drawings:

The car underframe consists of longitudinally disposed center sills 1 and 2, of channel cross section placed back to back, and spaced apart to receive at the ends the usual draft and buffing rigging (not shown) and intermediate shock absorption gears, Side sills 3 and 4, respectively, are also of channel cross section, though not necessarily so, and, as shown, face outwardly similarly to said center sills. Said center sills and side sills are connected as is usual in car constructions, by transverse web plates 5 and 6 which, as clearly shown in Fig. 4, are of a depth which increases toward the center sills of the car. Bolsters 7, and end sills hereinafter described connect all of said sills to afford a rigid structure. The center sills are rigidly connected at intervals in their length by means of webs 8. Braces are provided, if desired, extending from the corners of the underframe diagonally inward to the bolster adjacent thereto, and intermediate sills 10, are provided between the side sills and each center sill, and extend from bolster to end sill, as shown in Fig. 11. A draft and buffing gear 11, of any preferred kind and provided with a drawbar 12, and a coupler head 13, is connected between the center sills of the underframe at each end of the car in the customary manner, and the car wheels, which are merely illustrated diagrammatically, are indicated by the reference numeral 14. Laid across the side sills and adjacent the center sills of the underframe is a floor 15, preferably of heavy gage metal, and supported thereon and on the body bolsters at a plurality of points in the length of the underframe, are stationary cradle rests 16.

The sub-frame which carries the tank 17, movably upon the underframe, consists of large end shoes 18, which are slidably supported upon intermediate sills 10, and the center sills 1 and 2, respectively. The bottom of each shoe affords a broad flat inwardly extending base for bearing on said sills, and at its upper side is cylindrically concave and the inner front wall 19, of each is spherically concave, so that the ends of the tank are cradled therein and fit thereto as shown in Fig. 7. A central cylindrically curved plate 20, which fits to the under side of the tank, forms a part of said sub-frame, and rigidly secured to said plate by rivets or in any other suitable manner are bracing and supporting bearing members 21, each consisting of a sheet of metal bent to the desired shape and connected at its margins to said curved plate 20, and resting slidably upon the floor 15, on the underframe. Said shoes 18, and intermediate member 20, of the sub-frame are rigidly connected together by means of an I-beam 22, which extends longitudinally between the center sills and is riveted through its upper flanges to said plate 20, along its middle, and at each of its ends fits into a cored-out or slotted portion of the base of the respective shoes 18, as clearly shown in Figs. 4 and 10. Preferably the ends of said I-beams are riveted between two downwardly directed integral webs formed on the under side of each of the shoes 18, affording a very rigid connection between said plate 20, and said shoes 18, and lies close beneath the tank and in the central space between the respective center sills 1 and 2. Channel members 23, are rigidly secured back down by one of their flanges on the under side of the tank 17, and extend longitudinally thereof and radially therefrom, and bear upon the angled upper faces of said cradle members 16, thus affording guides for the tank, and preventing lateral displacement of the tank, as well as rotational movement thereof, upon the sub-frame or cradle.

One or more shock absorption gears 24, independent of the usual draft and buffing gears, are mounted at each end of the underframe on the end sills and between the center sills and the intermediate sills. For this purpose the end sill 25, is constructed of cast steel or other suitable material, and cored and webbed to receive the ends of the sills which are rigidly bolted or riveted thereto. Said end sill at its outer side extends above the sills to afford an end wall 26, for the absorbing gear casings, and integral upstanding webs 27, and 28, are provided above each center sill and each intermediate sill affording side walls for the gear casings.
Each of said gear casings contains a plurality of groups of resilient friction plates, denoted by the reference numeral 29, and a plate 30, is bolted to the webs 27 and 28, and covers the casings to inclose and conceal said plates therein. Slidably disposed within each of said casings, at the forward end thereof, is a concave follower block 31, and interposed between the respective groups of said friction plates is a convexly curved spacing member 32. Integral with the shoes 18, of the movable sub-frame of the car and extending outwardly from the front curved wall 19, thereof, are concave abutment heads 33, one for each gear casing, and which, as clearly shown in Fig. 9, bear at their outer ends against the ends of the outermost plate of one of the groups of friction plates within the corresponding casing. Said casings, are provided with inwardly directed shoulders 34, formed on the side walls of webs 27 and 28, as well as upon the inner end walls thereof, and act to prevent said groups of plates 29, from being drawn outwardly from their casings. Yokes or straps 35, one for each gear, are slotted at their ends and engage a pin 36, extending vertically through its abutment heads 33, and extends entirely around the groups of friction plates and the follower blocks 31. The cover 30, and the front and lower walls of the casings, are each recessed, as clearly shown in Fig. 5, to receive said yokes 35, slidably therein.

Another absorption gear is mounted intermediate the ends of the car between the center sills of the underframe, and for this purpose a horizontal floor plate 36ª, is flanged at its margins and riveted to and between the respective center sill channels 1 and 2. Also rigidly secured to said respective channel sills 1 and 2, are fixed stops or shoulders 37 and 38, respectively, disposed above said floor plate 36ª, and disposed in upright position and lying against the center sills, are vertical wear plates 39, of a length to fit closely between the respective fixed abutments 37 and 38. Resting upon the floor 36ª, and extending horizontally between said vertical wear plates 39, are groups of friction plates 40, with a double concave intermediate block member 41, disposed therebetween. At the outer ends of said groups of plates are convexly curved slidable follower blocks 42 and 43, respectively, one each contacting the outermost plate of each of said groups and normally held from movement therefrom by the fixed abutments 37 and 38. Fixed abutments 44 and 45, respectively, are riveted to and extend downwardly beneath said longitudinal I-beam 22, and are spaced apart sufficiently to fit closely over the outer surfaces of said respective follower blocks 42 and 43.

In order to positively retain the tank 17, and sub-frame upon the underframe of the car, a plurality of wide bars or straps 46, are provided which extend loosely around the tank, as clearly shown in Figs. 1 and 4, and through slots in the channels 23, secured thereon. The ends of said straps are secured to bracket plates 47, secured on the under surface of the lower flanges of the center sills by means of nuts engaged on the threaded ends of said strap bars, or in any suitable manner.

The operation is as follows:

The tank and its sub-frame is floatingly mounted on the underframe, and all of the absorption gears act to resist movement of the tank in either direction and, inasmuch as the stress transmitted between the underframe and the sub-frame on which the tank is supported, is distributed between said frames at substantially three different points, there is little possibility of damage occurring to the car under inertia or impact loads imposed thereon. Due to the even distribution of the stress throughout the sub-frame to the shock absorbing gears, but owing to the fact that the tank is supported thereon for practically the entire length thereof, the inertia effect of the contents of the tank is not liable to spring or deform the same, thus causing leakage, as would be the case were such a load stress concentrated at any one point.

When a shock is communicated to the car beyond the capacity of the ordinary buffing and draft gear provided, the inertia of the contents of the tank causes the same to remain substantially at rest upon the sub-frame, and the car underframe is moved along therebeneath driven by the impact. This causes the abutment heads 33, at one end of the car sub-frame to move inwardly within the casing 24, thus bending the plates 29, and of course such bending is resisted by the resiliency of the plates, as well as by the enormous friction therebetween. At the other end of the car the sub-frame exerting a draft upon the yokes 35, draws the concave follower blocks 31, outwardly, thus stressing the plates in the latter gear in a similar manner, the plates being held from withdrawal from the casing by the shoulders 34. When the end absorption gears of the car are thus brought into action, a similar operation takes place in the intermediate absorption gear; for instance, the abutment 44, forcing the follower block 42, inwardly, thus stressing the plates 40, which are held from movement at the other end of the gear by the follower block 43, bearing against the fixed abutments 38.

After the shock has been thus absorbed and dissipated in the form of heat, due to the friction between the plates, the resiliency or recoil effect of the plates of course may not be sufficient to move the sub-frame and tank back into normal position, but the constant vibration to which the car is subjected when in motion causes the tank to gradually recede to initial position, due to the restoring force exerted by the gears.

An exactly similar operation of absorbing the shock takes place when a sudden draft is imposed upon the car underframe, the inertia of the contents of the tank acting to resist the sudden change in speed or position thereof. The consequent stress thereby set up is absorbed by the gears connected between the sub-frame and the underframe of the car, so that injury to the connecting means between the tank and the car which would otherwise take place in instances where the tank is rigidly connected to the underframe, is entirely eliminated. The straps 46, secured around the tank, both at the ends and near the middle thereof, act to prevent the tank being displaced laterally from the car, as, for instance, when a sudden impact load is set up between the tank and the underframe, when the car is upon a sharp curve. The manner in which the absorption gears are secured upon the car underframe assists materially in reinforcing the entire structure and the convenient disposition thereof permits ready access thereto for the purposes of repair or examination at any time.

Of course it is understood that in absorption gears of the type described the inner faces of the followers or the abutment heads and the spacing member should be alternately convex and concave, that is to say the bearing on the groups of spring plates on each other is such that the pressure is applied alternately at the middle and the ends of successive groups, and of course sufficient initial tension is provided upon assembling to prevent end play of the tank and sub-frame through lost motion.

I am aware that various details of construction may be varied through a wide range without departing from the principles of this invention, and I therefore do not purpose limiting the patent granted otherwise than necessitated by the prior art.

I claim as my invention:

1. In a car of the class described an underframe, a sub-frame movably mounted thereon, a car body releasably supported in said sub-frame, and yieldable shock absorption gears connected between said sub-frame and said underframe at the ends and intermediate the ends of the car to yieldingly resist movement between said frames.

2. In a car construction of the class described a frame, a cradle sub-frame movably mounted thereon, bearing members therefor at the ends and middle thereof resting upon said underframe, a tank resting in said cradle frame, and yieldable means connected between the sub-frame and the cradle frame whereby relative movement therebetween is resisted, affording a floating support for the tank upon the underframe of the car.

3. The combination with the underframe of a car, of a cradle sub-frame movably mounted thereon comprising end bearing and central bearing members resting upon said underframe, and each shaped to receive a tank supported therein, and resilient absorption gears connected between the car underframe of the respective bearing members of the sub-frame to yieldingly resist relative movement between said frames due to the inertia of the tank supported in the sub-frame.

4. In a device of the class described the combination with the underframe of a car, embracing side and center sills of shock absorption gears connected thereto, a sub-frame movably mounted upon said underframe bearing thereon at the ends and at the middle thereof, a shock absorption gear connected on the underframe at the middle thereof, abutment heads on said sub-frame at the ends and middle thereof coacting with the respective shock absorption gears at the ends and middle of the underframe, and a tank cradled in said sub-frame and yieldably supported upon the underframe of the car.

5. In a device of the class described the combination with the underframe of a car having end sills thereon, absorption gears in said end sills, of a sub-frame movably mounted upon the underframe and comprising end and intermediate bearing members, said end members coacting with said absorption gears to resist movement of the sub-frame on the underframe, and a tank cradled in said sub-frame.

6. In a device of the class described the combination with the underframe of a car, absorption gears mounted at the ends and intermediate the ends thereof, of a sub-frame movably mounted upon said underframe and comprising end and intermediate bearing members all rigidly connected to one another, and each coacting with the respective absorption gears on the underframe, and a tank cradled in said sub-frame.

7. The combination with the underframe of a car, of a sub-frame movably mounted thereon, said sub-frame comprising end an intermediate bearing members, a longitudinal member rigidly connecting said bearing members one to another for simultaneous movement, shock absorption gears connected between said underframe and one of said bearing members to resist movement of the sub-frame upon the underframe, and a tank cradled in said underframe, said underframe shaped to conform to the curvature of the tank.

8. In a device of the class described the combination with the underframe of a car, of a sub-frame movably mounted thereon, said sub-frame comprising end and intermediate bearing members, all rigidly connected for simultaneous movement, a plurality of shock absorption gears mounted at each end of the underframe, means on said end bearing members of the sub-frame coacting therewith to resist movement of the sub-frame upon the underframe, and a tank cradled in said sub-frame and supported thereby and moving therewith.

9. In a device of the class described the combination with the underframe of a car, of absorption gears mounted at the ends and intermediate the ends thereof, a sub-frame movably mounted on said underframe comprising three bearing members, each one thereof coacting with one of the sets of absorption gears on the underframe of the car, a tank cradled in said sub-frame, stationary guide members secured on said underframe, and means mounted longitudinally on said tank and contacting said guide means to prevent rotation and displacement of said tank from said sub-frame.

10. In a device of the class described the combination with the underframe of a car, of a sub-frame mounted thereon, a tank cradled and supported in said sub-frame, absorption gears connected at the ends and intermediate the ends of the car between said respective frames to yieldingly resist relative movement therebetween, and stationary guiding and retaining means mounted on the underframe acting to maintain said tank properly positioned from displacement or rotation in said sub-frame.

11. In a device of the class described the combination with the underframe of a car, of absorption gears mounted at each end thereof affording the end sills of said underframe, a sub-frame mounted on the underframe, a plurality of means thereon at each end thereof coacting with the respective sets of absorption gears on said underframe to resist relative movement between frames, and a tank cradled in said sub-frame.

12. In a device of the class described the combination with a car underframe, of a tank yieldably mounted thereon, end shoes supporting said tank upon said underframe, and a rigid connection between said shoes.

13. In a device of the class described the combination with a car underframe, of end shoes and an intermediate cradle member, all rigidly connected to one another and movable upon said underframe, and a tank supported in said end shoes and cradle member to permit relative movement between the car underframe and the tank.

14. In a device of the class described the combination with a car underframe, end and center sills thereof, of absorption gears mounted at the ends and intermediate the ends of said car underframe upon said center sills, a tank, and means supporting the same upon the underframe and coacting with said absorption gears to resist movement of the tank relative the underframe.

15. In a device of the class described a car underframe, a sub-frame movably mounted thereon, a tank supported therein, absorption gears connected at the ends and intermediate the ends of said underframe to resist movement of the sub-frame thereon, and means retaining the tank upon said sub-frame and upon the underframe of the car.

In testimony whereof I have hereunto subscribed my name in the presence of two subscribing witnesses.

JAMES MILTON WAUGH.

Witnesses:
CHARLES W. HILLS, Jr.,
FRANK K. HUDSON.